June 10, 1930.   D. P. OWENS   1,763,564
ATTACHING MEANS FOR BRAKE TESTING DEVICES
Filed Nov. 1, 1927   2 Sheets-Sheet 1
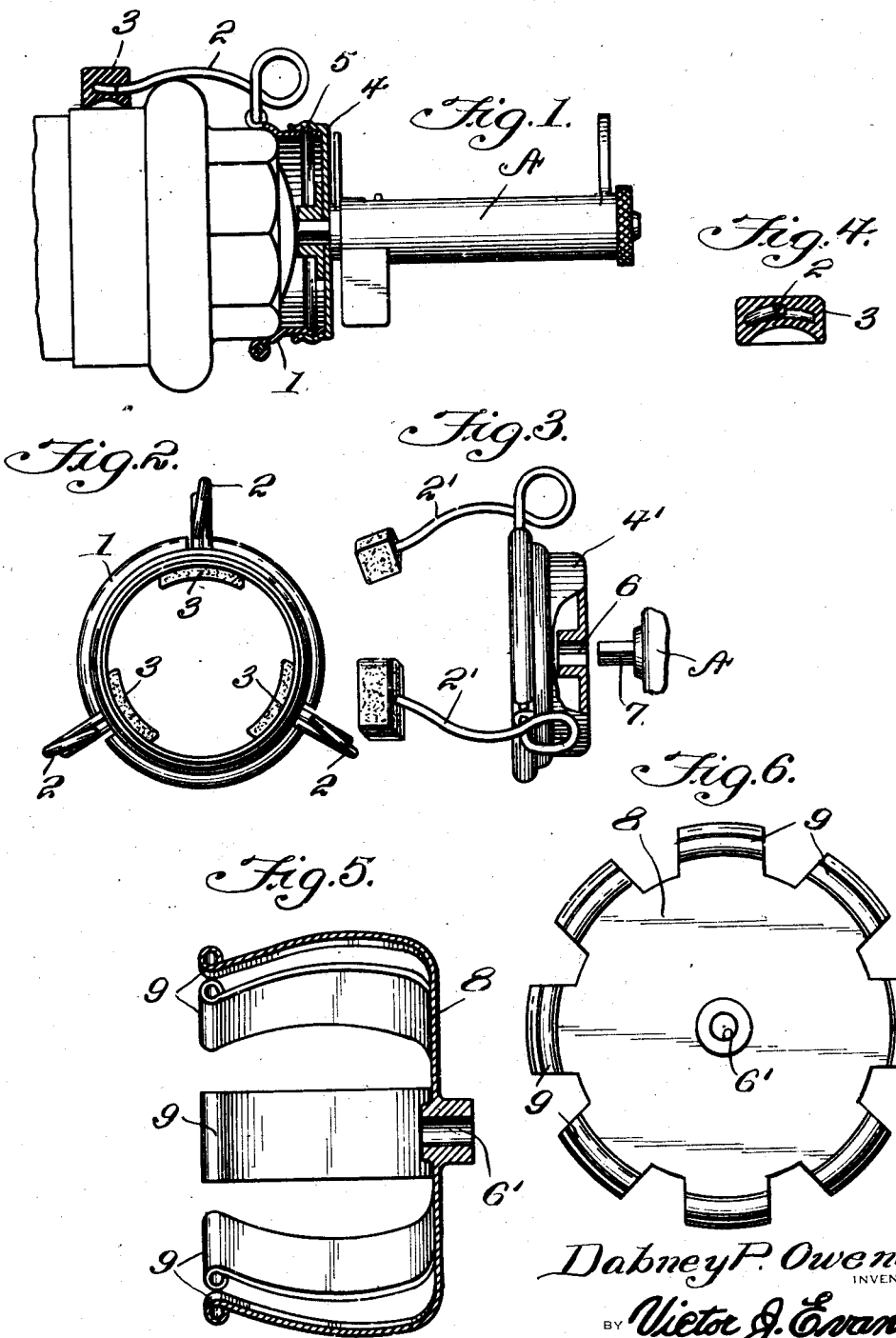

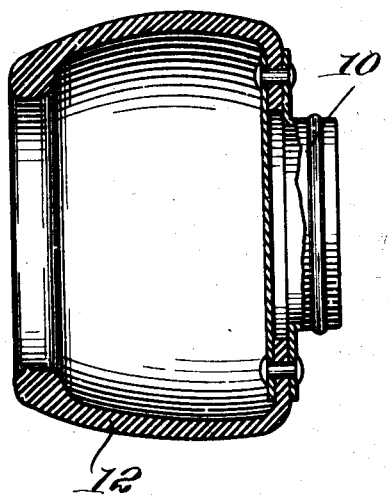
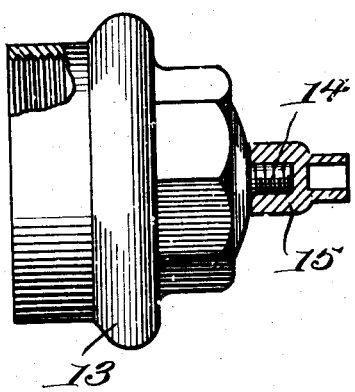
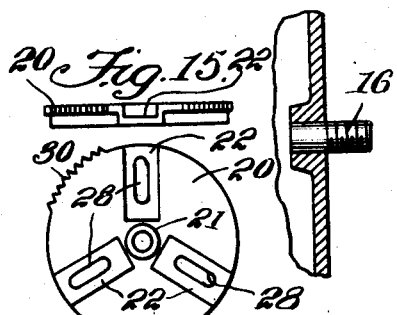
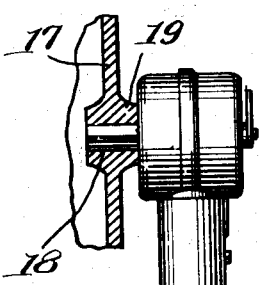
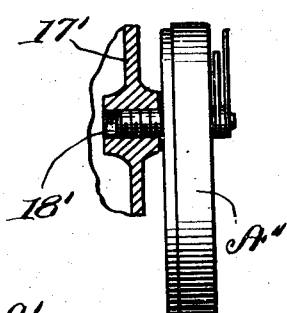
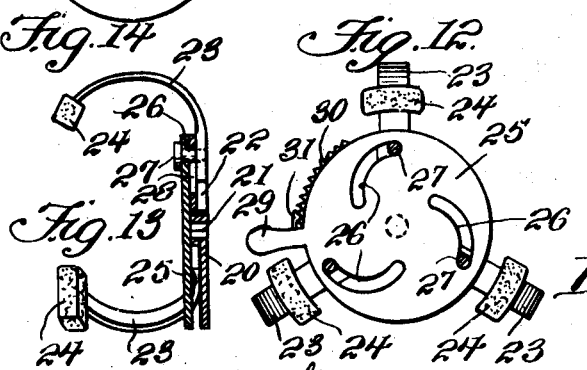

Patented June 10, 1930

1,763,564

UNITED STATES PATENT OFFICE

DABNEY P. OWENS, OF LAKE WORTH, FLORIDA

ATTACHING MEANS FOR BRAKE-TESTING DEVICES

Application filed November 1, 1927. Serial No. 230,306.

This invention relates to attaching means for detachably connecting one member to another, the general object of the invention being to provide means for attaching brake testing means, such as those forming the subject matter of an application filed November 1, 1927, Serial No. 230,303 to a hub cap of a vehicle or other part of a brake carrying element.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a view of one form of the invention, showing the same in use as attaching brake testing means to the hub cap of a vehicle.

Figure 2 is a front view of the ring member and its clamping arms.

Figure 3 is a side view with parts broken away, showing a slight modification.

Figure 4 is a sectional view through one of the vacuum members.

Figure 5 is a sectional view showing another form of the invention.

Figure 6 is a view looking toward the inner end of said member.

Figure 7 is a sectional view showing another modification.

Figure 8 is a view of a hub cap provided with a centrally arranged lug for receiving a member which supports the brake testing device.

Figures 9, 10 and 11 are detail views showing further modifications.

Figures 12, 13, 14 and 15 are views of another modification.

Referring to Figures 1 and 2, 1 indicates a ring member which is adapted to be pressed upon the end of a hub cap or other part of a brake carrying element. This member has attached thereto the spring clamping arms 2, each of which has fastened to its extremity a vacuum cup or cushion 3 for engaging a part of the cap so that the ring member is detachably and firmly fastened to the hub cap. A cap 4 is firmly but detachably connected with the ring member by the beads 5, one of which is formed on the ring member and the other on the cap. The cap has a square hole in its center for receiving the squared end of a shaft forming part of the brake testing device A which forms the subject matter of the application before mentioned.

By this arrangement of parts, the device A can be easily and quickly attached to a hub cap or other part of a brake carrying element and in such a manner that it can be easily removed or replaced. The ring member may remain in place at all times and the cap 4 slipped over the same when the device A is to be used. After the brakes have been tested, the cap can be removed from the ring member.

Figure 3 shows the clamping arms 2' connected directly with the cap 4' so that the ring member is omitted, the cap fitting over the hub cap. This cap is provided with the central opening 6 of square shape in cross section to receive the squared end 7 of the shaft of the device A.

Figures 5 and 6 show another form of the invention in which a cap-like member 8 is provided with the flat spring arms 9 which are spaced and have rounded extremities. Thus this member can be pushed over a hub cap or the like and its spring arms will grip the same and thus hold the device on the hub cap and cause it to rotate therewith. This member is also provided with a central opening 6' for receiving a part of the device A.

Figure 7 shows another modification in which the central portion of the cap member is composed of a metal part 10 and the sides of the cap member are composed of rubber 12 which is riveted or otherwise fastened between two flanges of the metal part. Thus when this cap member is pushed over a hub cap, the rubber sides will expand to receive the cap and then they will contract upon the cap to firmly hold the device on the hub cap.

Figure 8 shows a hub cap 13 or device shaped similar to a hub cap which is provided with a threaded projection 14 at the central part of its outer end which is adapted to enter a threaded socket in a coupling piece 15 which is formed with an outer square socket to receive a part of the registering device.

Figure 9 shows a threaded projection 16 carried by a part which may be attached to any of the devices shown in the other figures which engage the hub cap or this projection may be attached directly to the hub cap, as shown in Figure 8.

Figure 10 shows the supporting member 17, which may be any one of the hub cap engaging parts shown in the previous figure or any other part, provided with a square opening 18 for receiving a squared part of the registering device A'. The support 17 is reinforced on both faces, as shown at 19, and the opening passes through these reinforcements.

Figure 11 shows the reinforced supporting member 17' provided with a threaded hole 18' to receive a threaded part of the device A''.

From the foregoing it will be seen that I have provided simple means for detachably but non-rotatably connecting a supporting member for a device, such as a brake testing device, to a brake carrying element so that the revolutions of said element will be registered by the device.

Figures 12, 13, 14 and 15 show a form of the invention which comprises a plate 20 having a central socket 21 therein to receive the shaft of the registering device and also having a number of radial recesses 22 therein which receive enlarged ends of the arms 23 which carry the vacuum cups or pads 24. A second plate 25 rests upon the plate 20 and is provided with a number of arc-shaped slots 26 through which pass the screws 27 which also pass through slots 28 in the plate 20 and engage threaded holes in the enlarged ends of the arms 23. These screws act to hold the parts together and by turning the plate 25 by means of its handle 29, the engagement of the walls of the slots 26 with the shanks of the screws will move the screws and the arms in such a manner that the arms are moved toward and away from each other. Thus by adjusting the parts to move the arms away from each other, the device can be placed on a hub cap and then by another adjustment of the parts, the arms can be moved toward each other to cause them to grip the hub cap and thus fasten the device to the cap. The plate 20 is provided with a toothed part 30, the teeth of which are engaged by a dog 31 on the handle 29 to hold the parts in adjusted position.

It is thought from the foregoing description that the advantages and novel features of my invention will be readily apparent.

It is to be understood that I may make changes in the construction and in the combination and arrangement of the several parts, provided that such changes fall within the scope of the appended claim.

What I claim is:—

Means for connecting a brake testing device to a hub cap, comprising a cap-shaped member formed of rubber and having a small open end to fit over the hub cap and frictionally engage the same, the outer end of the member having an opening, inner and outer metal parts fastened to the outer end of the member and covering the opening and means on the outer metal part for supporting a brake testing device.

In testimony whereof I affix my signature.

DABNEY P. OWENS.